Sept. 4, 1956 L. F. PAHL ET AL 2,761,606
FILLING MACHINE
Filed July 16, 1954 2 Sheets-Sheet 1

INVENTORS:
Leo F. Pahl,
Frederick E. Faxth,
Carl L. Day,
BY
Cushman, Darby & Cushman
ATTORNEYS.

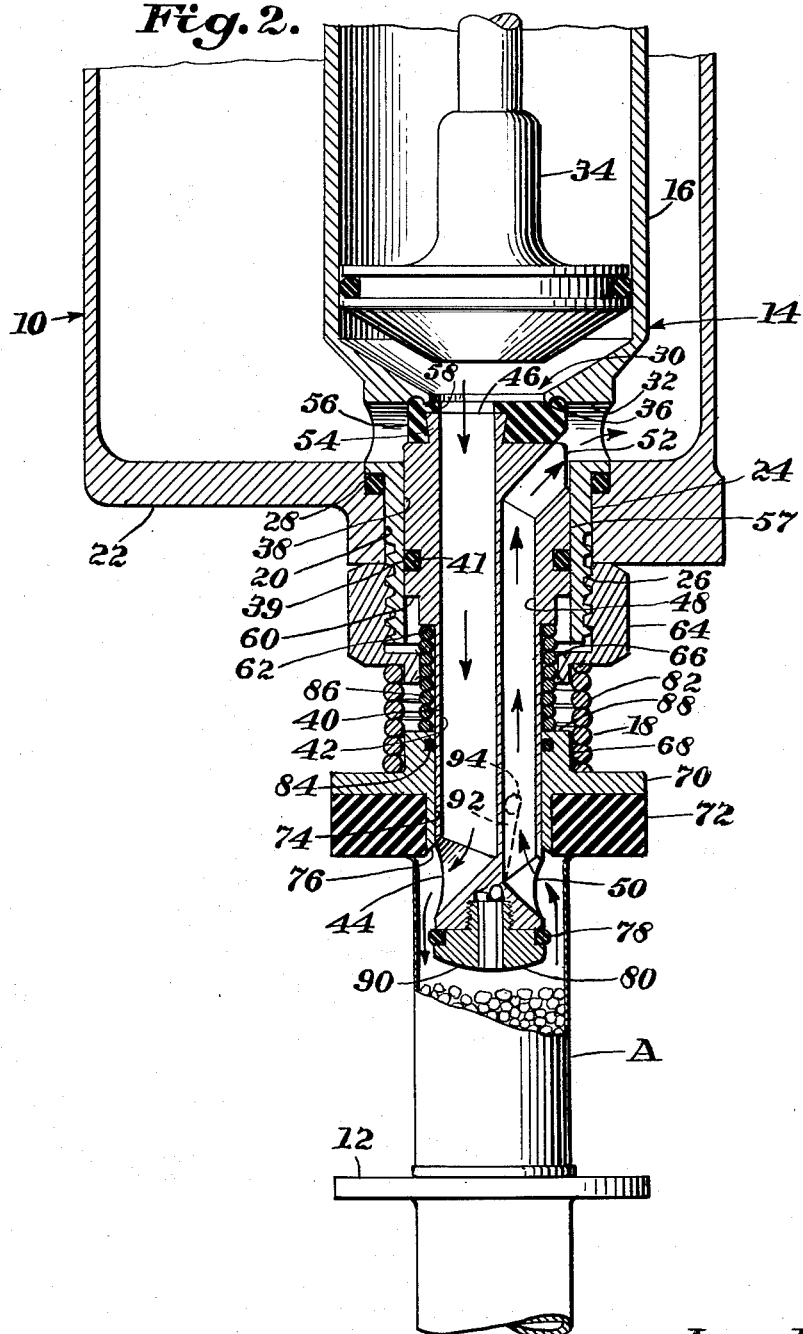

United States Patent Office 2,761,606
Patented Sept. 4, 1956

2,761,606

FILLING MACHINE

Leo F. Pahl, Frederick E. Fauth, and Carl L. Day, Baltimore, Md., assignors to Crown Cork & Seal Company, Inc., Baltimore, Md., a corporation of New York Application July 16, 1954, Serial No. 443,762

14 Claims. (Cl. 226—107)

The present invention relates to an apparatus for filling containers with either a viscous or a thin flowable product and, more particularly, to a filling machine having a filling valve capable of filling or partially filling containers with a measured charge of the product.

In food processing, containers are oftentimes partially filled with solids, such as berries, fruits, vegetables, meats or the like, and after the food products have been filled into the container, liquid is added. The liquid in some instances is filled to protect the food product from spoilage, while in other instances it may be added for providing flavor to the product. This operation of adding liquid to a container partially filled with solids is usually called in the food processing industry "juicing or syruping."

In our copending application, Serial No. 443,763 filed July 16, 1954, an apparatus and method is disclosed for filling containers with a measured charge of a viscous or thin flowable product. The filling valves disclosed in the aforementioned application are particularly adapted for use in dispensing such products as garnished soups, catchup, cream, mayonnaise, salid dressing, peanut butter, grease or various paste products and the like. The filling machine structure and operation, and the details of the charge measuring cylinder and its control, are disclosed in our copending application, as well as filling valves for performing the particular type of filling disclosed therein. Therefore, it will suffice to say that the subject matter of the aforementioned copending application, pertaining to the details of the filling machine structure, its operation and controls, and the charge measuring cylinder, its operation and control, will not be repeated herein, it being understood that the copending application referred to discloses mechanisms which would be used with the present invention, and to that extent it forms a part of the present disclosure.

An object of the present invention is the provision of a filling machine capable of filling containers already partially filled with solids brim full or with any measured amount of liquid.

Another object of the present invention is the provision of a filling machine for filling containers partially filled with solids with liquids slightly under pressure. The advantage of filling containers having solid material therein, with liquid partially under pressure, is that air trapped between the solid materials can be removed by the liquid being flowed to the container under pressure.

Another object of the present invention is the provision of a filling machine and filling valve capable of filling or partially filling containers with a measured charge of the liquid.

Still another object of the present invention is the provision of a filling valve having means for breaking the vacuum created between the container and the valve when the container is being removed from the valve after being filled with the liquid.

A still further object of the present invention is the provision of a filling valve which can be readily disassembled and cleaned so that it meets the sanitary requirements of various States and local governments. Ancillary to the preceding object it is a further object of the present invention to provide a filling valve eliminating hidden crevices in which bacteria could collect.

Still another object of the present invention is the provision of a filling valve which will not operate when there is no container present beneath the filling valve. In other words, the filling valve is only open to the flow of liquid from the charge measuring cylinder upon actuation by a container.

These and other objects of the present invention will appear more clearly in the following specification, claims and drawings, in which:

Figure 2 is a cross-sectional view of the filling machine similar to Figure 1 but showing the filling valve open and a container being filled by a measured charge from the charge measuring cylinder.

Figure 1:
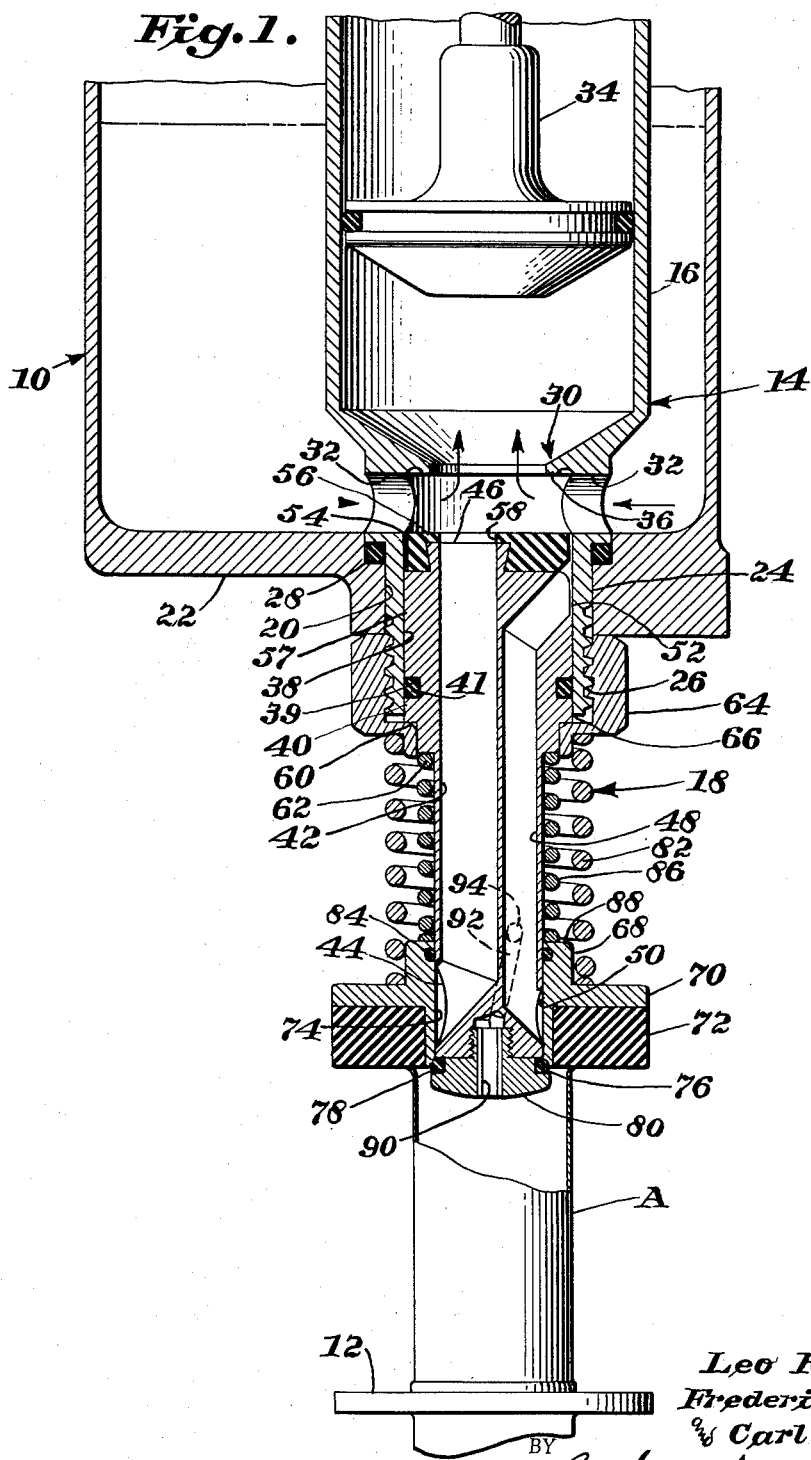
Figure 1 is a cross-sectional view of the filling machine of the present invention, showing the filling valve in the closed position and the charge measuring cylinder being re-charged. Portions of the filling machine are omitted, it being understood that details of these portions are shown in our aforementioned copending application.

Referring specifically to the drawings, the filling valve of the present invention disclosed therein is of a type which is incorporated in a filling machine such as disclosed in our aforementioned copending application. In that application, the filling machine was disclosed as a rotary type filling machine having a plurality of filling heads mounted on its reservoir, each filling head including a filling valve and a charge measuring cylinder. In the aforementioned application it was pointed out that the filling valve was engaged by containers positioned on container-supporting platforms and that the filling valve was raised vertically with respect to the reservoir to seat against a valve seat on the lower end of a charge measuring cylinder to thereby trap a charge in the charge measuring cylinder. After the charge had been trapped in the charge measuring cylinder a sequence of operations occurred, the first of which included opening of the valve and then movement of the piston within the charge measuring cylinder forcing the trapped product therein to be dispensed into the container. After the container had been filled, it was lowered from the filling valve and transferred to a container closing mechanism of any suitable type. It will be noted that in the aforementioned application the container was vented to atmosphere and that the valves disclosed were either self-operating or cam operated by movement of the rotary structure.

As disclosed in Figure 1 of the drawings, the filling machine (not shown in detail) includes a rotary structure having a reservoir 10 and container supporting platforms 12 mounted thereon. A plurality of filling heads, generally indicated at 14 are mounted in the reservoir in vertical alignment with each of the container supporting platforms 12. The drawings disclose only one filling head and one container supporting platform for the purposes of clarity, as it is believed that the structure for the filling machine is sufficiently disclosed in our aforementioned copending application.

Filling head 14 of the present invention includes a charge measuring cylinder 16 and a filling valve structure, generally indicated at 18. Charge measuring cylinder 16 is positioned within reservoir 10 in vertical alignment with a bore 20 in the bottom wall 22 of the reservoir. Cylinder 16 may be supported within the reservoir in any suitable manner. Preferably cylinder 16 is provided at one end thereof with a reduced portion 24 having a bore 38 therethrough and threads 26 on its outer surface. Reduced portion 24 is adapted to extend through bore 20 in the reservoir 10, the threads 26 being exposed below the bottom 22 of reservoir 10. Between the walls of reduced portion 24 and bore 20, a suitable O-ring seal 28 may be provided to prevent liquid within reservoir 12 from leaking therefrom. The discharge end of cylinder 16 is generally indicated at 30 and is spaced from bottom wall 22. Reduced portion 24 is provided with a plurality of laterally or radially extending passages 32 in the portion which extends above the upper surface of bottom wall 22 of reservoir 10. Laterally extending passages 32 permit the interior of cylinder 16 to be in normally open communication with the interior of reservoir 10.

Mounted within cylinder 16 is a piston 34 which is moved vertically in time relationship with the containers A and filling valve 18 by means of mechanisms disclosed in our aforementioned copending application. Further, the stroke of piston 34 can be adjusted in the same manner that is disclosed in our aforementioned copending application, whereby the amount of charge to be dispensed from cylinder 16 may be varied or adjusted. Mounted on the discharge end 30 of cylinder 16 is a downwardly facing circumferential valve seat 36, the purpose of which will be discussed more fully later in the specification.

A tubular member 40 is supported in bore 38 of reduced portion 24 for vertical movement with respect to reservoir 10 and cylinder 16. The wall of tubular member 40 is provided with a circumferential groove 39 which is adapted to receive an O-ring seal 41 which prevents leakage between bore 38 and the outer wall of the tubular member. Tubular member 40 is provided with a longitudinal liquid flow passage 42 terminating at its lower end in a laterally facing liquid discharge port 44 and at its upper end in an upwardly facing liquid inlet port 46. Also provided in tubular member 40 is a longitudinal vent passage 48 terminating at its lower end in a laterally facing vent port 50 oppositely disposed from the port 44 and at its upper end in a laterally facing vent port 52 positioned below the upwardly facing port 46 of liquid passage 42.

The upper end of tubular member 40 is provided with a reduced undercut portion 54 which is adapted to receive a rubber sealing element 56 having a passage 58 therein adapted to be aligned with the liquid flow passage 42. Rubber sealing element 56 is expanded to fit over the undercut reduced portion 54 and is then frictionally held thereon.

The upper enlarged body portion 57 of tubular member 40 is provided with downwardly facing shoulders 60 and 62. A lock nut 64 is threaded onto the threads 26 of the end portion 24 of cylinder 16 and retains the cylinder in position in reservoir 10. Lock nut 64 is provided with a shoulder 66 which is adapted to engage the shoulder 60 of tubular member 40 and retain the tubular member in the bore 38 as well as limit its downward movement.

Mounted on the lower end of tubular sleeve 40 and adapted to slide axially thereon is a collar member 68 having a circumferential flange 70. Collar member 68 is also provided with a circumferential rubber sealing ring 72 frictionally held thereon and adapted to abut against flange 70. The lower surface of ring 72 provides a sealing surface for the lip of container A. The lower end of bore 74 of collar member 68 is provided with a drip valve seat 76 which cooperates with a sealing ring 78 mounted on tubular sleeve 40 below liquid port 44 and vent port 50. Sealing ring 78, which may be of the O-ring type, is retained in position on tubular member 40 by means of a valve tip element 80 threaded into the end of the tubular member.

A compression spring 82 is provided between lock nut 64 and the flange portion 70 of collar member 68 and normally seats valve drip seat 76 against sealing ring 80. When collar member 68 is in its extended position, as shown in Figure 1, it will be noted that the ports 44 and 50 of passages 42 and 48, respectively, are closed by the wall of the bore 74. The sealing ring 84 can also be positioned above ports 44 and 50 in an internal groove on member 68 to prevent leakage between the outer wall of tubular member 40 and collar member 68.

A second spring member 86 concentric with and telescoped by spring member 82 is positioned between shoulder 62 on tubular member 40 and a shoulder 88 on collar member 68. Spring member 82 permits relative movement between collar member 68 and tubular member 40 after sealing element 56 has seated on valve seat 36.

Valve tip element 80 is provided with a longitudinal bore 90 which communicates with the lower end of an angularly positioned passage 92 in tubular member 40. The upper end or port 94 of passage 92 communicates with atmosphere when collar member 68 is in its extended or downward position, closing ports 44 and 50.

The operation of the device may be described as follows: A container A is positioned on container supporting platform 12 and platform 12 is raised vertically so as to bring the container lip into sealing engagement with the lower surface of rubber sealing ring 72. Continued upward movement of container A and platform 12 will cause collar member 68 and tubular member 40 to be raised as a unit until such time that rubber sealing element 56 on the upper end of tubular member 40 engages the valve seat 36 on charge measuring cylinder 16. After sealing element 56 has formed a seal with valve seat 36, continued upward movement of container A will cause collar member 68 to move vertically on tubular member 40 opening ports 44 and 50 to the interior of the container. At the same time that the collar member 68 moves vertically to open ports 44 and 50, it will also close the port 94 of passage 92. Immediately after the valve has been opened, the timed stroke of discharge piston 34 in cylinder 16 begins and the piston moves downwardly in the cylinder to force a charge trapped therein through passage 42 in tubular member 40 out of port 44 into the container as shown in Figure 2. Air in the container will be vented through port 40 in passage 48 into the reservoir below the surface of liquid therein.

In the case where a container is to be filled brim full by the liquid, the stroke of piston 34 can be adjusted, as disclosed in our aforementioned copending application so as to compensate for the different amounts of solids in containers. In other words, an excess charge of liquid is flowed into the container and the excess being forced upwardly into the vent passage 48. This will leave the container brim full when the container is lowered from the filling valve. The subsequent downward stroke of piston 34 will cause any liquid trapped in vent passage 48 to be returned to the reservoir below the level of liquid therein. It is, of course, within the scope of the present invention that any amount of liquid desired can be flowed into the container by adjusting the stroke of piston 34.

It will be noted that by providing a positive displacement piston 34 in charge measuring cylinder 16, the liquid trapped therein will be forced into container A under a slight positive pressure, the air in the container being exhausted to the interior of the reservoir below the level of liquid therein through vent passage 48. The advantage of juicing or syruping containers partially filled with solids under slight pressure is now obvious in that any air trapped between the solids in the containers is forced out and vented to the reservoir.

After the container has been filled, it is ready to be withdrawn from the filling valve by the lowering of container supporting platform 12. As container A lowers, collar member 68 will be urged downwardly by the tension of springs 82 and 86 until the valve drip seat edge 76 contacts the seal ring 78, thus closing valve ports 44 and 50. Further downward travel of the container will allow the valve sealing ring 56 to leave valve seat 36 and open the interior of the reservoir to the interior of cylinder 16 so that the cylinder may be re-charged. After sealing ring 56 leaves valve seat 36, piston 34 will start on its upward stroke and will draw a new charge from the interior of the reservoir through passages 36 to the interior of charge measuring cylinder 16.

Since sealing ring 72 has a bellows action when engaged by the lip of a container, a slight vacuum may be caused in the container when the container is being lowered away from sealing ring 72. To break the vacuum, passage 92 is provided to place the interior of the container in open communication with atmosphere. In other words, when collar member 68 moves downwardly to close liquid flow port 44 and vent port 50, it will also open port 94 to atmosphere. Port 94 being open to atmosphere will equalize the pressure between the interior of the container and atmosphere and, thus, the container can be removed from rubber sealing ring 72 without adhering thereto.

Besides the adjustment of the stroke of piston 34 to adjust the amount of charge being dispensed by cylinder 16, the fill level of container A may also be adjusted by removing and replacing rubber sealing ring 72 with another rubber sealing ring of a different thickness. By having the rubber sealing ring frictionally held in place on collar member 68, this adjustment can be made on the individual filling heads of a filling machine, at any desired time. Of course, this adjustment contemplates the use of valve tip element 80 as a headspacer element to displace liquid in container A.

The filling valve of the present invention is container-actuated and in the event that there is no container beneath the valve when container platform 12 raises and piston 34 lowers in charge measuring cylinder 16 there will be no discharge of liquid onto platform 12 and the container-supporting table. The reason for this is that the filling valve will not be raised and, consequently, valve seat 36 on charge measuring cylinder 16 will not engage sealing ring 56 to trap a charge in the cylinder. The liquid in charge measuring cylinder 16 will be dispensed back through the laterally opened passages 32 to the interior of the reservoir.

The filling valve of the present inventon may be utilized for blending products such as where it is desired to fill containers with a specific quantity of each of a plurality of products. In other words, a plurality of filling machines, each having a filling valve of the type disclosed, can be connected together so that containers passing from one machine to another will receive a measured amount of product from each machine. The flexibility of such an arrangement is unlimited since such combinations of products as liquids and pastes can be filled into the same container.

The teminology used in the specification is for the purpose of description and not limitation, the scope of the invention being defined in the claims.

We claim:

1. In a container filling machine of the class described, a reservoir having a bore in its bottom wall, a charge measuring cylinder positioned in said reservoir above and in vertical alignment with said bore, said cylinder having its end adjacent said bore spaced from said bore and in normally open communication with the interior of said reservoir, a valve seat on the end of said cylinder which is adjacent said bore, a piston mounted in said cylinder for dispensing a measured charge of a flowable product, valve means supported in said bore for vertical movement with respect to said reservoir, said valve means including a vertically movable member having a surface on its lower end for engaging and sealing with the lip of a container and a valve element on its upper end adapted to seat against the valve seat of said cylinder when said valve means is raised vertically by a container to trap a charge in said charge measuring cylinder, said valve means further including a longitudinal flow passage therethrough communicating the interior of said cylinder with said container when said valve means is in the raised position and a vent passage therethrough which will communicate with the interior of said reservoir and container when the valve means is in the raised position.

2. A filling machine of the character described in claim 1, wherein means operable when said flow and vent passages are closed is provided on said valve means for breaking the vacuum created in the container when the container is lowered from said valve means.

3. A filling machine of the character described in claim 1, wherein the container engaging member of said valve means includes means to close said flow and vent passages when said valve means is in its lower position.

4. A filling machine of the character described in claim 1, including resilient means normally urging said container engaging member to a position closing said flow and vent passages, said member being adapted to open said flow and vent passages after said valve means is raised vertically and its upper end is in sealing engagement with the valve seat of said charge measuring cylinder.

5. In a container filling machine of the class described, a reservoir having a bore in its bottom wall, a charge measuring cylinder positioned within said reservoir in vertical alignment with the bore and having its end adjacent the bore in normally open communication with the interior of the reservoir, a downwardly facing valve seat mounted on the end of said cylinder which is normally in open communication with the interior of the reservoir, means for dispensing a measured charge from said cylinder, valve means supported in said bore and adapted to move vertically with respect to said reservoir, said valve means including an elongated tubular member having a longitudinal flow passage therethrough opening laterally at the bottom thereof and a longitudinal vent passage therethrough opening laterally at its bottom end and laterally at its upper end below the open upper end of the flow passage, a sealing element mounted on the upper end of said tubular member and having a passage therethrough for alignment with the flow passage, said sealing member adapted to engage the valve seat on said cylinder to trap a charge therein when said valve means is raised vertically by a container, means on the lower end of said valve means for normally closing said flow and vent passages, said last mentioned means also including a surface for sealing engagement with the lip of a container, said last-mentioned means upon engagement by a container adapted to move said valve means vertically to cause the sealing element of the upper end thereof to seat on the valve seat of said cylinder and then to open said flow and vent passages.

6. A device of the character described in claim 5, including means on said tubular member adapted to place the interior of a container into open communication with atmosphere when the container is being lowered from a container filling position and after said flow and vent passages have been closed.

7. A filling machine of the character described in claim 5, wherein the means for dispensing a measured charge of a flowable product from said cylinder is a piston.

8. A filling machine of the character described in claim 5, wherein the vent passage of said valve means will place the interior of the container into communication with the interior of the reservoir below the level of the product in the reservoir when said valve means is in a raised dispensing position.

9. In a container filling machine of the class described, a reservoir having a bore in its bottom wall, a charge measuring cylinder positioned in said reservoir and having one end thereof in normally open communication with the reservoir and in vertical alignment with said bore, the open end of said cylinder being spaced from the bottom of said reservoir and having a downwardly facing valve seat thereon, means for charging said cylinder and dispensing the charge therefrom, a tubular member mounted in said bore for vertical movement with respect to said reservoir, said tubular member including a vertical liquid flow passage opening laterally at its lower end and a vertical vent passage opening laterally at its lower end and laterally at its upper end below the upper opening of the liquid flow passage, means on the upper end of said tubular member and surrounding said flow passage for seating against the valve seat on said cylinder when the tubular member is raised vertically, said tubular member being provided at its lower end below the openings of said liquid flow and vent passages with sealing means, a collar member mounted on and movable with respect to said tubular member, said collar member including a circumferential flange and a circumferential sealing ring for sealing engagement with the lip of a container, said collar member also having a valve seat on its lower end adapted to seat against the sealing means on said tubular member so as to close said liquid flow and vent passages, spring means normally urging said collar member and said sleeve member apart so as to close said liquid flow and vent passages, and a second spring means normally urging said collar member and said reservoir apart.

10. A filling machine of the character described in claim 9, wherein the product is flowed into the container under a slight pressure and wherein means are provided for breaking the vacuum caused when the container is being lowered away from the sealing ring.

11. A filling machine of the character described in claim 10, wherein the means for breaking the vacuum in the container is an angularly positioned passage in the lower end of said tubular member, said angularly positioned passage having its lower end opened to the interior of the container while its upper end is open to atmosphere.

12. A filling machine of the character described in claim 11, wherein the upper end of said angularly disposed passage is normally open when said collar member is in its extended position with respect to said reservoir and is closed when said collar member is moved vertically to open said liquid flow and said vent passages.

13. In a container filling machine of the class described, a reservoir for a flowable product and having a bore in its bottom wall, valve means supported in said bore, said valve means including a tubular member having longitudinal flow and vent passages therein, a container engaging member mounted on the lower end of said tubular member and movable vertically with respect thereto, said container engaging member normally closing said flow and vent passages and adapted to open said flow and vent passages when engaged by a container and raised vertically with respect to the tubular member, and means on said tubular member operable to an open and closed position by said container engaging member for breaking the vacuum created in the container when the container is lowered from said container engaging member, said last mentioned means being opened by said container engaging member to place the interior of the container in communication with atmosphere when the container is being lowered from a container filling position and after the container engaging member has been lowered to a position closing the flow and vent passages, said last mentioned means being closed to atmosphere by said container engaging member when said container engaging member is raised vertically with respect to said tubular member to a position where said flow and vent passages are opened.

14. A filling machine of the character described in claim 13 wherein said vacuum breaking means is an angularly positioned passage in the lower end of said tubular member, said angularly positioned passage having its lower end open to the interior of the container while its upper end is open to atmosphere when said container engaging member is lowered to a position closing said flow and vent passages, the upper end of said passage being closed to atmosphere by said container engaging member when said container engaging member is in its raised position and said flow and vent passages are open.

References Cited in the file of this patent
UNITED STATES PATENTS

| | | |
|---|---|---|
| 756,428 | Strasburger | Apr. 5, 1904 |
| 1,170,672 | Rice et al. | Feb. 8, 1916 |
| 1,364,650 | Steere | Jan. 4, 1921 |